United States Patent
Delalat

(10) Patent No.: US 6,414,633 B1
(45) Date of Patent: Jul. 2, 2002

(54) DEVICE FOR LOCALIZING A TRANSMITTER UNIT

(75) Inventor: Hamid Delalat, Kuriskrona (SE)

(73) Assignee: Micro Positioning AB, Karlskrona (SE)

( * ) Notice: Subject to any disclaimer, the term of this patent is extended or adjusted under 35 U.S.C. 154(b) by 0 days.

(21) Appl. No.: 09/831,298

(22) PCT Filed: Nov. 8, 1999

(86) PCT No.: PCT/SE99/02026

§ 371 (c)(1),
(2), (4) Date: May 9, 2001

(87) PCT Pub. No.: WO00/28345

PCT Pub. Date: May 18, 2000

(30) Foreign Application Priority Data

Nov. 9, 1998 (SE) ................................................ 9803817
Jun. 23, 1999 (SE) ................................................ 9902400

(51) Int. Cl.⁷ ................................................ G01S 5/04
(52) U.S. Cl. ........................................ 342/442; 342/463
(58) Field of Search ................................ 342/442, 450, 342/457, 463, 464

(56) References Cited

U.S. PATENT DOCUMENTS

| | | | |
|---|---|---|---|
| 3,680,121 A | 7/1972 | Anderson et al. | |
| 4,799,062 A | * 1/1989 | Sanderford et al. | 342/450 |
| 4,954,836 A | 9/1990 | Sakuma | |
| 5,021,794 A | 6/1991 | Lawrence | |
| 5,513,854 A | 5/1996 | Daver | |
| 5,722,064 A | * 2/1998 | Campana | 455/351 |

FOREIGN PATENT DOCUMENTS

| | | |
|---|---|---|
| DE | 2843253 | 4/1978 |
| WO | WO97/43660 | 11/1997 |

* cited by examiner

*Primary Examiner*—Dao Phan
(74) *Attorney, Agent, or Firm*—Swidler Berlin Shereff Friedman, LLP

(57) ABSTRACT

A device for localizing a transmitter unit. The device includes a base unit and at least one transmitter. The transmitter unit includes an attachment operable to attach the transmitter unit to an object. A transmitter member is arranged to transmit a signal having a determined frequency content. The base unit is arranged to receive the signal from the transmitter member and includes at least two antennas that are positioned a relatively small distance from each other and are arranged to sense the signal. The base unit includes a processing member that is arranged to calculate at least the direction to the transmitter unit utilizing the signal sensed by the antennas. The transmitter unit includes a receiver member. The base unit includes a transmitter member. The transmitter member of the base unit and the receiver member of the transmitter unit are arranged to communicate with a protocol.

13 Claims, 3 Drawing Sheets

DEVICE FOR LOCALIZING A TRANSMITTER UNIT

THE BACKGROUND OF THE INVENTION AND PRIOR ART

The present invention refers to a device for localising a transmitter unit.

Today many people have difficulties to know where different things or objects are located, for instance with regard to such things as keys, cellular telephones, bicycles or other vehicles, bags etc. The problem ought to be more significant due to the growing amount of things which we uses daily. The problem does not only concern things or objects but also the difficulty to know the position of domestic animals or other individuals, for instance children.

U.S. Pat. No. 4,954,836 discloses an arrangement for determining the position of a transmitter For the determination of the position, several antennas which are located at different positions are utilized. The antennas are positioned at a large distance from each other.

U.S. Pat. No. 5,513,854 discloses a system for following the position of one or several persons moving on a field, in particular a sports field, and which each carries a micro transmitter. The set of antennas is provided to receive signals from the micro transmitters. The antennas are provided at a large distance from each other.

U.S. Pat. No. 5,021,794 discloses a system for localising persons carrying a micro transmitter. A plurality of mobile receivers is provided to receive a signal from a micro transmitter and for localising the micro transmitter with respect to the direction and the distance.

In these known devices the receiving arrangements have a complicated structure comprising several separate units.

WO97/43660 discloses a device for localising and detecting a microwave source at short distance within an area. The device comprises at least four antennas arranged in two pairs. The phase displacement between the signals to the two antennas in each pair is calculated and by means of the calculated phase displacement the source is localised.

SUMMARY OF THE INVENTION

The object of the present invention is to provide improved possibilities to supervise different objects and/or persons.

This object is obtained by the device initially defined, which is characterised in that the base unit comprises at least two antennas, which are positioned at a relatively small distance from each other and which each is arranged to sense said signal, and a processing member which is arranged to calculate at least the direction to said transmitter unit by means of the signals sensed by the antennas. By such a single base unit, the determination of the direction may be made in a simple manner. Since the antennas are provided at a small distance from each other, the base unit may have small dimensions and a compact shape. Consequently, the base unit may be carried by one person. Thanks to the attachment means comprised by the transmitter unit, which preferably has small dimensions, the transmitter unit may be attached to an arbitrary object, a person or an animal, the position of which thus may be supervised.

According to an embodiment of the invention, said signal is sensed by a phase displacement between the different antennas due to said distance between the antennas. Thereby, the processing member may be arranged to measure this phase displacement and to calculate said direction by means of the phase displacement measured. Thereby, a first and a second of three separate antennas may form a first pair of antennas, wherein a first phase displacement of the signal received between these two antennas is determined. and the second and the third of the antennas form a second pair of antennas, wherein a second phase displacement of the signal received between these two antennas is determined, By means of the first and the second phase displacement said direction from each of said pairs may be calculated. It is also possible by means of the first and the second phase displacement to determine at least one approximate position of said transmitter unit.

According to a further embodiment of the invention, said transmitter unit comprises a receiver member and the base unit a transmitter member. Consequently, it is possible to let the base unit be arranged to transmit a signal to said transmitter unit which may be arranged to transmit the signal back to the base unit, wherein the processing member may be arranged to measure the time period from the transmission of the signal to the transmitter unit until the signal is received by the base unit, and by means of the time period measured to determine the distance to said transmitter unit. In such a manner, it is also possible, in addition to the determination of the direction to the transmitter unit, also to obtain a proper knowledge about the distance from the bass unit to the transmitter unit. Advantageously, the processing member may be arranged to Galculate the position of said transmitter unit by means of the determined direction, obtainable by means of one single pair of antennas, and the determined distance, obtainable by means of one or two of the antennas of said single pair.

According to a further embodiment of the invention, the base unit may be arranged to activate the transmitter member of the transmitter unit by a transmission permission which is transferred to the transmitter unit via the transmitter member of the base unit and the receiver member of the transmitter unit. In such a manner. the transmitter member of the transmitter unit may be activated only when its position Is to be determined, which reduces the energy consumption in comparison with if the transmitter member of the transmitter unit would have been continuously activated.

Advantageously, the transmitter member of the, base unit and the receiver member of the transmitter unit may be arranged to transfer said transmission permission by means of a protocol, preferably a CDMA/CD protocol.

According to a further embodiment of the Invention, each of said antennas comprises an essentially straight antenna. Advantageously, the antennas may extend in essentially the same direction. The distance between two adjacent antennas may be less than 1 meter, preferably less than 60 cm and in particular about 30 cm. The resolution of the determination of the position is controlled by the distance between the antennas. Preferably, the antennas may be arranged in a circular configuration which results in a satisfactory spatial resolution.

According to a further embodiment of the invention, the base unit is mobile, either as a portable unit or for instance mounted in or to a vehicle.

According to a further embodiment of the invention, the device comprises at least two transmitter units, wherein each transmitter unit is arranged to transmit a signal according to an identification protocol and wherein the base unit is arranged to identify the transmitter unit in question by means of said identification protocol. In such a manner it is possible for a user to supervise the position of a very large number of objects by only one base unit.

According to a further embodiment of the invention, a display member is arranged to display information about said position of said transmitter unit to a user. The display member may be an integrated part of the base unit or may be formed by a unit, such as a computer or a screen, connected to the base unit.

BRIEF DESCRIPTION OF THE DRAWINGS

The invention is now to be explained more closely by a description of different embodiments and with reference to the drawings attached.

DETAILED DESCRIPTION OF DIFFERENT EMBODIMENTS OF THE INVENTION

Figure 1:
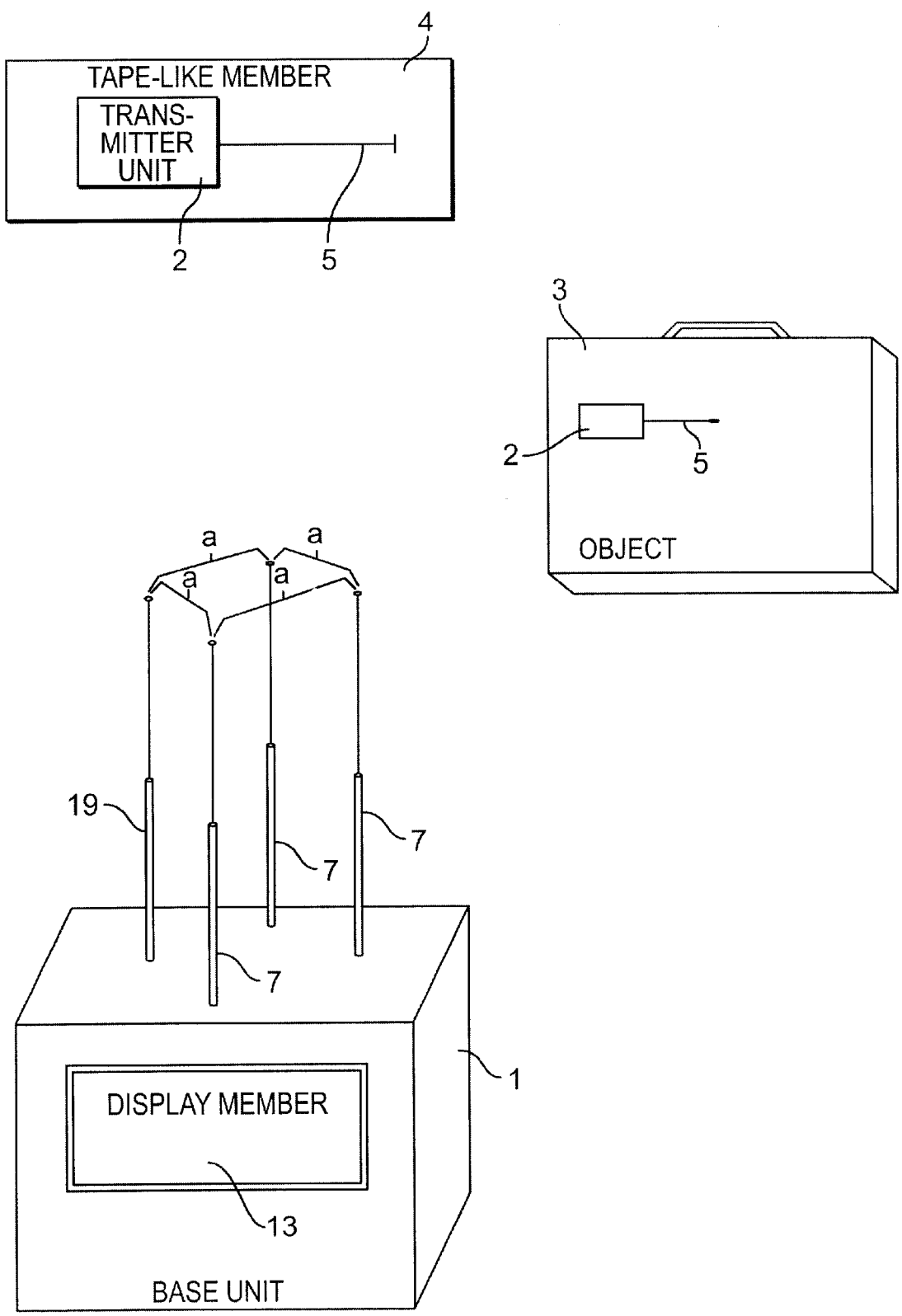
FIG. 1 discloses schematically a device having a base unit and a number of transmitter units according to an embodiment of the invention.

FIG. 1 discloses a device for localising or determining the position of a transmitter unit 2. The disclosed device or arrangement comprises a base unit 1 and two transmitter units 2. The transmitter units 2 comprises means enabling attachment of the transmitter units 2 to an object 3, which in FIG. 1 is exemplified by a bag. The transmitter unit 2 may also be attached to any other things, objects, or animals or children. The second transmitter unit 2, which is disclosed in FIG. 1, is provided on a tape-like member 4 enabling attachment to an arbitrary object. Also other types of attachment members may be utilised, for instance different types of clamps, safety pins, or the like. Consequently, the transmitter units 2 have small dimensions and a characteristic essentially flat shape. Each transmitter unit 2 comprises an antenna 5 schematically disclosed. Although FIG. 1 discloses only two transmitter units 2, it is to be noted that the device according to the invention may comprise a very large, essentially arbitrary number of transmitter units 2.

Figure 2:
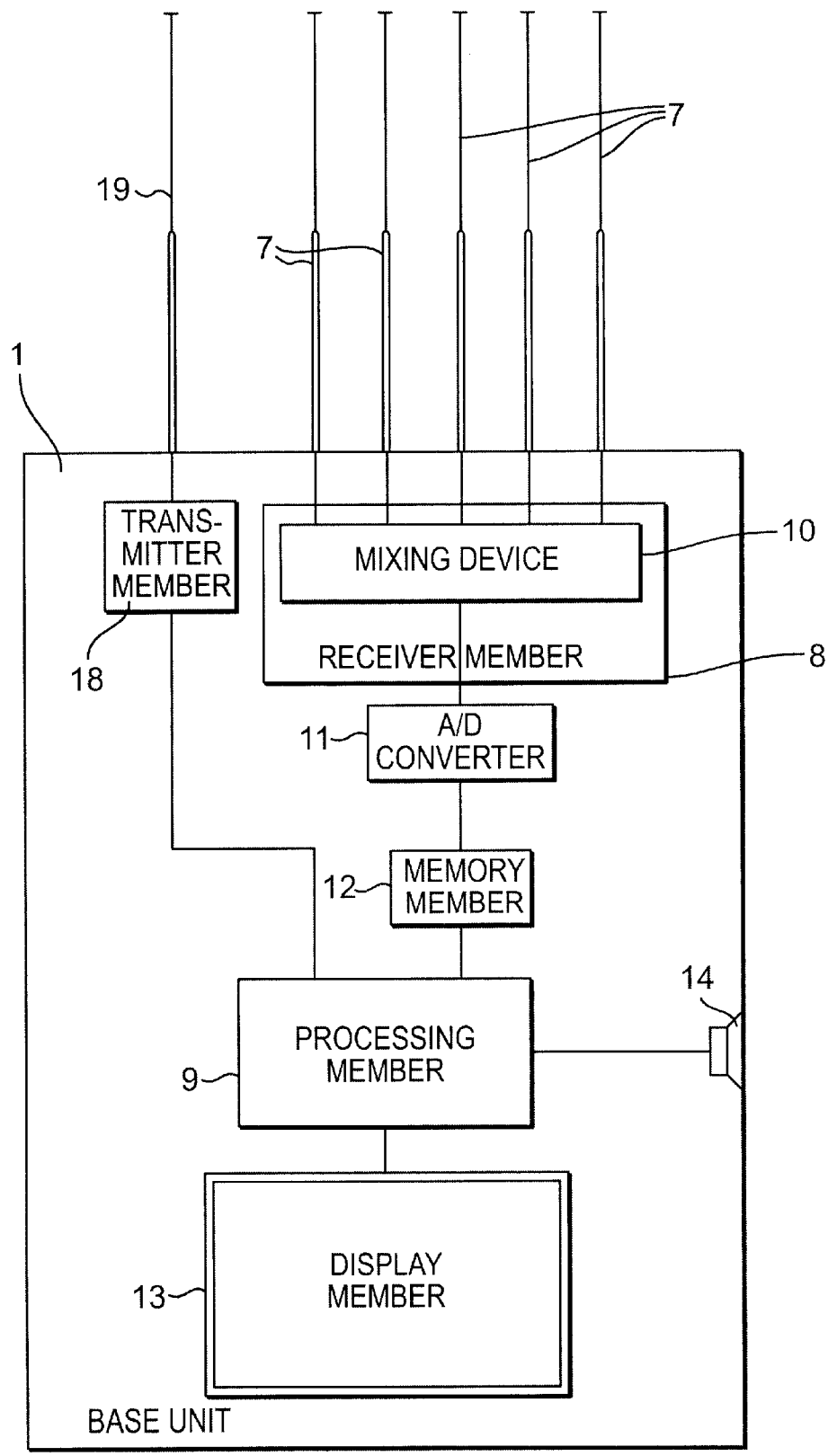
FIG. 2 discloses schematically the structure of the base unit.
Figure 3:
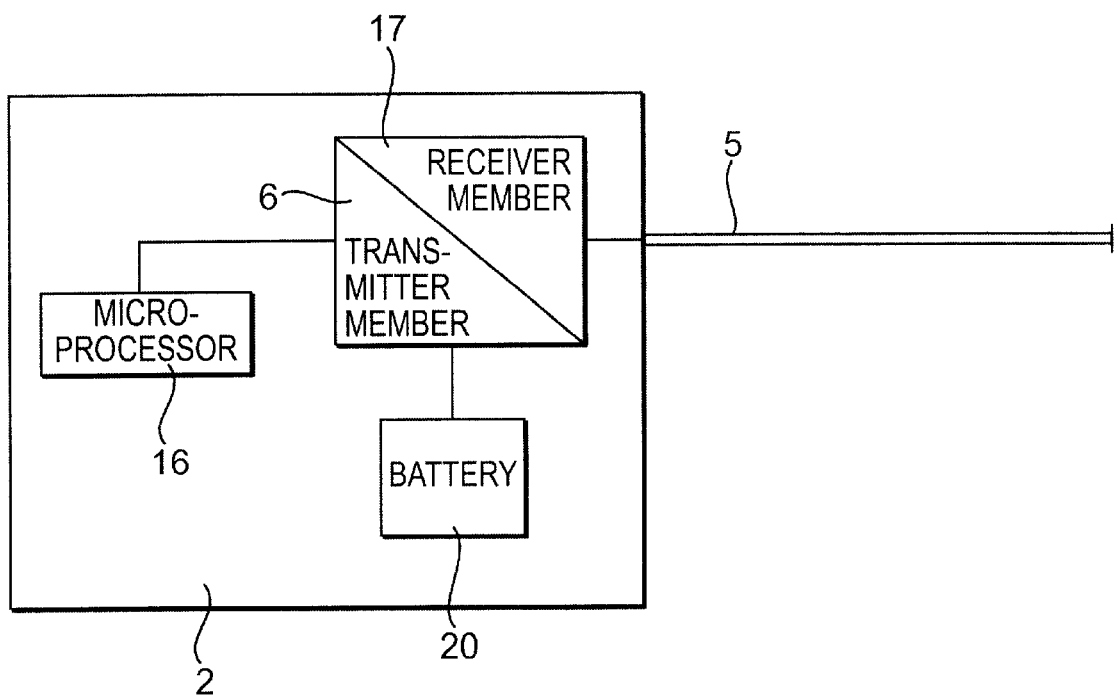
FIG. 3 discloses schematically the structure of a transmitter unit.

Each transmitter unit 2 comprises, see FIG. 3, a transmitter member 6 which is arranged to transmit a signal having a determined frequency content. The base unit 1 comprises at least two antennas 7 and a receiver member 8, see FIG. 2, which is arranged to receive said signal from the transmitter units 2. As appears from FIG. 1, the antennas 7 of the base unit 1 are positioned in a circular configuration and at a relatively small distance a from each other. The distance a between two adjacent antennas 7 is less than 1 m, preferably less than 60 cm and may be for instance 40, 30, 20 or 10 cm. The antennas 7 are designed as essentially straight metal rods which possibly may be extendable and which extend in essentially the same direction. Preferably, the antennas 7 are demountable in a simple manner by a user. It is to be noted that it is also possible to design the antennas 7 in other ways and to position the antennas 7 in any other configuration, for instance a triangular configuration or along a straight line. It is also possible to arrange the antennas 7 In such a manner that they are directed radially outwardly for instance from a common center point. In FIG. 2, the device includes six antennas 7 and 19 Although the device will function with only two antennas 7 for a determination in two dimensions and with three antennas for a determination in three dimensions, the number of antennas may vary. It is considered that the accuracy of the determination of the direction to and thus the position the transmitter unit 2 in question may increase with the number of antennas 7. In case of several antennas 7, the result may be filtered, wherein distortion, noise and/or an incorrect position may be disregarded. In particular, it may be advantageous to use 6–9 antennas 7, for instance 7 or 8 antennas 7. Due to the distance a between the antennas 7 in a three-dimensional space, a signal having the determined frequency content from a transmitter unit 2 will hit different antennas 7 at different points of times.

Due to this time difference the signal will be sensed by the antennas 7 with a phase displacement between the different antennas 7 Such a phase displacement is detectable. Thereby, a first and second of the three separate antennas 7 may form a first pair, wherein a first phase displacement of the signal received between these two antennas 7 is determined. and the second and the third of the antennas 7 may form a second pair, wherein a second phase displacement of the signal received between these two antennas 7 is determined. By the knowledge about the distance a between the different antennas 7 and by means of the first and the second phase displacement, the direction from the base unit 1 to the transmitter unit 2 may be calculated. It is also possible to determine, by means of the first and the second phase displacement, at least an approximate position of the transmitter unit 2 in question and thus of the objects 3 to be supervised One example of a possible construction of the base unit 1 is disclosed in FIG. 2 The base unit 1 disclosed comprises a processing member 9 which may comprise a microprocessor. The processing member 9 may also be formed by a computer, preferably a portable computer type such as a pocket computer. The antennas 7 are connected to the processing member 9 via a mixing device 10 or a multiplexing device by means of which the signals from one of said pair of antennas 7 are multiplied. Consequently, the base unit 1 is arranged, by means of the processing unit 9, to analyse the signal from the transmitter unit 2 via one of said pair of antennas 7 at a time in order to determine the phase displacement therebetween. The multiplied signal obtained is digitilised by means of an analogue/digital converter 11. The digital signal is transmitted to a memory member 12 of the type FIFO (first in, first out) for intermediate storing. From the memory member 12, the signal is supplied to the processing member 9. By means of suitable algorithms, comprising triangulation, the direction to the transmitter unit 2 in question may be determined with a high accuracy. An approximate value of the position of the transmitter unit 2 may also be obtained. It is also possible to provide an analogue/digital converter 11 for each antenna 7. Thereby, the mixing device 10 may be dispensed with and the mixing may be performed in the processing member 9 In a digital manner.

As appears from FIG. 2, the base unit 1 may also comprise a display member 13 in the form of a screen, for instance a LCD-screen. By means of the display member 13, the actual position of the transmitter unit 2 in question may be shown to a user. Furthermore, the base unit 1 comprises a loudspeaker 14 or any similar sound generating member which is connected to the processing member 9 and which may be arranged to produce a warning signal to a user, for instance when the transmitter unit 2 in question and an object associated therewith is located at a distance from the base unit 1 which exceeds a predetermined level.

Each transmitter unit 2 also comprises an antenna 6 which is connected to the transmitter member 6 for initiating the signal with a determined frequency. In order to differentiate the different transmitter units 2 from each other, the signal from each transmitter unit 2 may comprise a unique identification protocol, ie. each transmitter unit 2 may transmit a unique code which is superpositioned the determined frequency. The code may be generated by means of a microprocessor 16.

Furthermore, each transmitter unit 2 may comprise a receiver member 17 which Is arranged to communicate with a transmitter member 18 of the base unit 1. Thereby, the transmitter member 18 of the base unit 1 which is connected to the processing member 9 may be arranged to transmit a signal to one of the transmitter units 2 which in turn transmits the signal back to the base unit 1 which receives the signal via one of the receiving antennas 7. The processing member 9 is thereby arranged to measure the time period from the transmission of the signal to the transmitter unit 2 until the signal is received by the base unit 1 and by means of the time period measured to determine the absolute distance from the base unit 1 to the transmitter unit 2 in question. The processing member 9 may comprise a pulse counter for said time measurement.

By means of this determination of the distance and the determination of the direction mentioned above, the processing member 9 may thus calculate the position of the transmitter unit 2 in question according to an algorithm such as, for instance, Maximum Likelihood Estimation or Generalised Cross Correlation.

The base unit 1 may also be arranged to transmit a signal in the form of a transmission permission via the antenna 19 to the receiving member 17 of a transmitter unit 2 in order to activate the transmitter member 6 of this transmitter unit 2. It is to be noted that the antenna 19 which in the embodiment disclosed is utilised for the transmission of the signal to the transmitter unit 2 may be formed by one of the receiving antennas 7. Such a receiving antenna 7 may thus have both a transmitting and a receiving function. The base unit 1 may therefore function with only three antennas as mentioned above. The base unit 2 disclosed has relatively small dimension and is advantageously designed in such a manner that it is mobile and that it may be carried by a user, i.e. the base unit 2 is to be carried by a user when he moves within different areas.

The communication between the receiving member 17 and the transmitter member 18 may be performed via any conventional protocol, such as CDMA-CD or Blustooth, wherein the members 6, 17 comprise a modulator/demodulator and a communication proper is performed by means of the microprocessor. By the fact that the transmitter unit 2 thus only needs to transmit the signal at determined points of time at a determined frequency to the base unit 2 the energy consumption of the battery 20 of the transmitter unit is reduced significantly.

The processing member 9 of the base unit i may also be arranged to localise a transmitter unit 2 which is moving. Thereby, the Doppler effect may be utilised in connection with the determination of the position and in particular for the determination of the distance.

The present invention is not limited to the embodiments disclosed but may be varied and modified within the scope of the following claims.

What is claimed is:

1. A device for localising a transmitter unit (2), comprising a base unit (1) and at least one such transmitter unit (2), wherein said transmitter unit (2) comprises means (4), which enable attachment of the transmitter unit (2) to an object (3), and a transmitter member (6), which is arranged to transmit a signal having a determined frequency content, wherein the base unit (1) is arranged to receive said signal and comprises at least two antennas (7), which are positioned on a relatively small distance (a) from each other and each arranged to sense such signal, and wherein the base unit (1) comprises a processing member (9), which is arranged to calculate at least the direction to said transmitter unit (2) by means of the signal sensed by the antennas (7), characterised in that said transmitter unit (2) comprises a receiver member (17), the base unit (1) comprises a transmitter member (18), and the transmitter member (18) of the base unit (1) and the receiver member (17) of the transmitter unit (2) are arranged to communicate by means of a protocol.

2. A device according to claim 1, wherein said signal is sensed by a phase displacement between the different antennas (7), due to said distance between the antennas (7), characterised in that the processing member (9) is arranged to measure this phase displacement and to calculate said direction by means of the phase displacement measured.

3. A device according to claim 1, characterised in that the base unit (1) is arranged to transmit a signal to said transmitter unit (2) which is arranged to transmit said signal back to the base unit (1), wherein the processing member (9) is arranged to measure the time period from the transmission of the signal to the transmitter unit (2) until the reception of the signal by the base unit (1), and by means of the time period measured determine the distance to said transmitter unit (2).

4. A device according to claim 3, characterised in that the processing member (9) is arranged to calculate the position of said transmitter unit (2) by means of the determined distance and the determined direction.

5. A device according to claim 4, characterised in that the base unit (1) is arranged to activate the transmitter member (6) of the transmitter unit (2) by a transmission permission which is transferred to the transmitter unit via the transmitter member (18) of the base unit and the receiver member (17) of the transmitter unit.

6. A device according to claim 5, characterised in that the transmitter member (18) of the base unit (1) and the receiver member (17) of the transmitter unit (2) are arranged to transfer said transmission permission by means of a CDMA/CD protocol.

7. A device according to claim 1, characterised in that each of said antennas (7) comprises an essentially straight antenna (9).

8. A device according to claim 7, characterised in that the antennas (7) extend in essentially the same direction.

9. A device according to claim 1, characterised in that the distance (a) between two adjacent antennas are less than one meter.

10. A device according to claim 1, characterised in that the base unit (1) is mobile.

11. A device according to claim 1, characterised in that the device comprises at least two transmitter units (2) and that each transmitter unit is arranged to transmit a signal according to an identification protocol and that the base unit (1) is arranged to identify the transmitter unit (2) in question by means of said identification protocol.

12. A device according to claim 1, characterised by a display member (13) which is arranged to display information about said position of said transmitter unit (2) to a user.

13. A device according to claim 12, characterised in that the display member (13) is an integrated part of the base unit (1) or formed by a unit, such as a computer, connected to the base unit (1).

* * * * *